March 18, 1958 J. J. MARTIN 2,827,560
VEHICLE LAMP

Filed Sept. 27, 1954 2 Sheets-Sheet 1

INVENTOR
James J. Martin
BY
ATTORNEY

March 18, 1958     J. J. MARTIN     2,827,560
VEHICLE LAMP

Filed Sept. 27, 1954     2 Sheets-Sheet 2

INVENTOR
James J. Martin
BY
J. E. Ross
ATTORNEY

# United States Patent Office 2,827,560
Patented Mar. 18, 1958

2,827,560

VEHICLE LAMP

James J. Martin, Chesterfield, Ind., assignor to General Motors Corporation, Detroit, Mich., a corporation of Delaware Application September 27, 1954, Serial No. 458,347

4 Claims. (Cl. 240—8.3)

This invention relates to vehicle lamps and more particularly to vehicle rear lamps adapted for use on vehicles having highly stylized bodies.

A general trend in current motor vehicle design is toward highly stylized body configurations wherein the body lines tend to be long and sweeping. As a result of such overall design trends, vehicle rear lamps have been integrated with the vehicle body to preserve and blend in with its contours and styling in contradistinction to the tail lamps previously used which were designed primarily from the optical standpoint and generally independent of the body styling.

Rear lamps of the integrated type, to which my invention is directed, present a serious problem in that it is essential to have an inexpensive device which will perform its extremely important safety functions in the desired manner. In this regard, it is a well recognized fact in the art that the more complex the geometric configuration of a lens, the more complex and thus the more expensive is the optical design to obtain the uniformity, directivity and intensity of lighting required in a vehicle tail lamp. Accordingly, since the lamps to which I have reference blend in with the contours of the highly stylized vehicle bodies, the use of a lens as conventionally conceived would be impractical because of expense in forming the optics.

It is therefore an object of my invention to provide a simple and inexpensive rear lamp for vehicles which is adapted to blend in with the body contour. It is a further object of my invention to provide a rear lamp for vehicles which is adapted to blend in with the body contour and give the desired lighting characteristics. It is a further object of my invention to provide a rear lamp having the maximum signal surface area.

The objects of my invention are attained by providing a rear lamp having an outer light passing window of such configuration as to blend in with the contour of that portion of the vehicle body on which it is positioned and having a substantially plane inner lens adapted to control the lighting characteristics of the lamp.

The above and further objects of my invention will be apparent from the foregoing description with reference to a preferred embodiment thereof shown on the accompanying drawings, in which.

Figure 1:
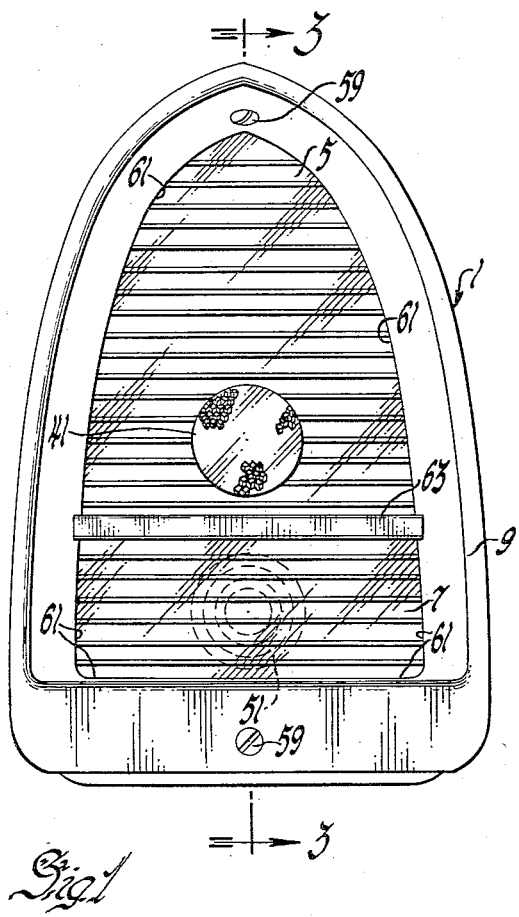
Figure 1 is a front elevation of the lamp of my invention.
Figure 2:
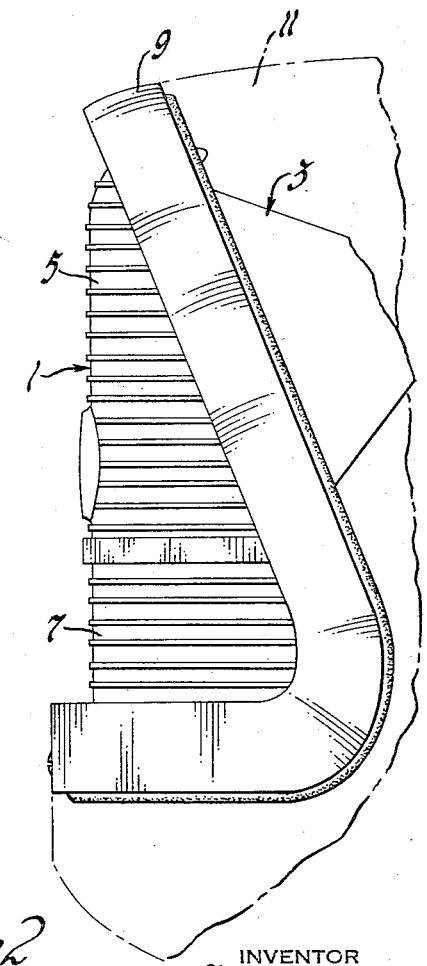
Figure 2 is a side elevation of the lamp shown in Figure 1.

Having specific reference to Figures 1 and 2 of the drawings, there is shown a rear lamp 1 comprising a housing 3 on the front of which there are positioned a red upper lens 5 and a crystal lower lens 7 which may be formed of any suitable material such as glass or plastics and are surrounded by a bright metal plated and polished lamp door 9. As can be clearly seen in Figure 2, the portion 11 of the vehicle body on which the lamp 1 is adapted to be positioned is formed with a mounting surface tilted rearwardly with respect to the vertical plane transverse to the vehicle body. The door 9 is formed with a corresponding tilt and may be made of any suitable material such as sheet metal stampings or castings.

Figure 3:
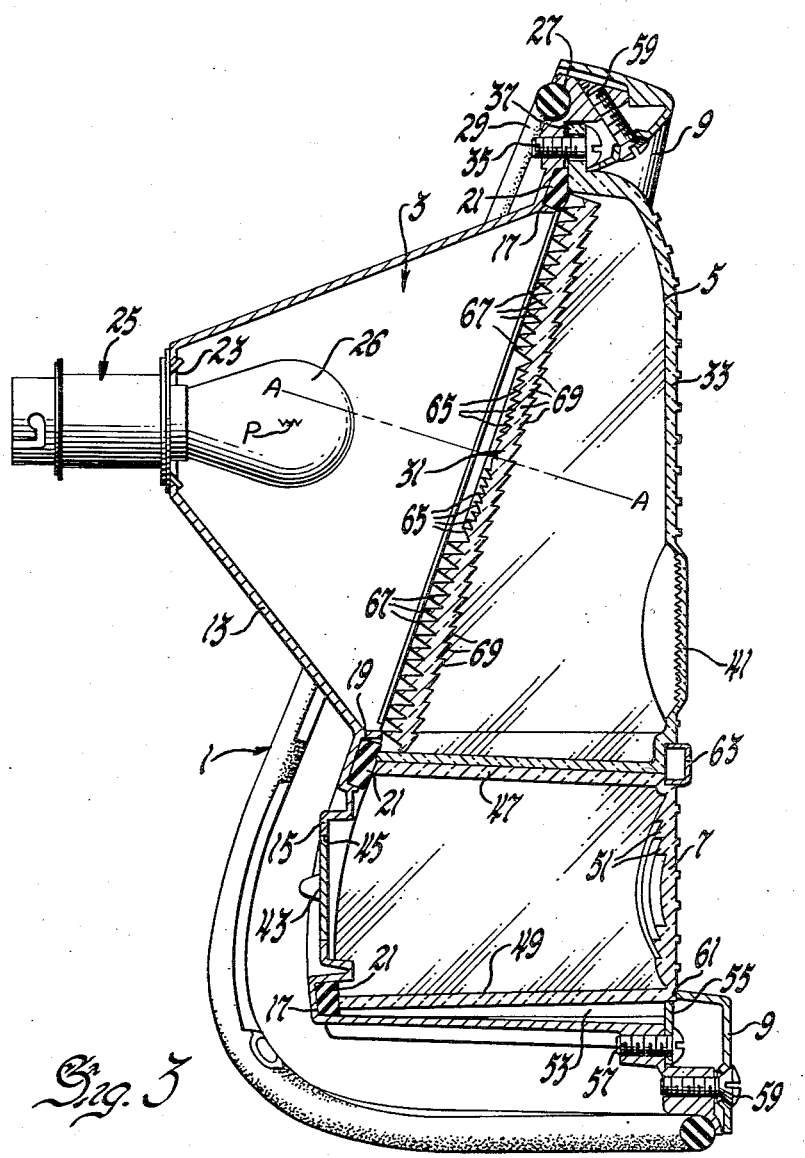
Figure 3 is a sectional view taken on line 3—3 of Figure 1 showing the lens and lamp structure and the relationship between the focal point of the lamp and the turning axis of the concentric prisms formed on the lens.

The structure of the lamp 1 is clearly shown in Figure 3. The housing 3 may be formed of a metal diecast and consists of an upper tail and stop section 13 and a lower back-up section 15. The housing 3 is formed with a groove 17 on the periphery of its outer surface, a similar groove 19 extending horizontally between its sides and connecting with the groove 17. Positioned within grooves 17 and 19 is a sealing gasket 21 formed of rubber or any suitable rubber-like material. The tail and stop section 13 is shown as being substantially conical in shape and is provided with an aperture 23 in its rearmost portion in which a bulb and socket assembly 25 of any well known design is mounted in any suitable manner. As is clearly shown in Figure 3, a groove 27 of arcuate cross-section is provided on the periphery of the inner surface of the housing 3, a resilient sealing gasket 29 being positioned therein in order to permit the lamp 1 to be mounted on the vehicle in a water-tight relationship therewith.

The stop and tail section 13 is provided with a substantially plane inner lens 31 and an outer lens 33. The inner lens 31 serves to modify the light beam to produce the desired optical characteristics as will be more specifically set forth hereinafter and may be formed of any suitable material such as red glass or plastic. The outer lens serves to generally conform the contour of the lamp 1 to that of the portion of the vehicle body on which it is mounted. The lens 31 is positioned in section 13 with its surface tilted rearwardly with respect to the vertical plane at an angle conforming to that of the door 9 and extends across the entire open face of section 13 in a plane passing through the door. In this manner, the presence of the lens 31 is not apparent when the lamp is viewed from the side at the same time that the maximum signal surface area is presented. The lens 31 is retained in its predetermined position by means of the outer lens 33 which is fastened to the housing 3 by means of the bolt 35 passing through a flange-like portion 37 formed on the upper edge thereof. The inner edge of the lens 33 is formed to abut with the front peripheral surface of the lens 31. As is conventional in the art, the outer lens 33 is provided with a reflex button 41. When positioned on the lamp 1, the rearmost edges of lens 33 abut the sealing gasket 21 thus forming a weather-proof connection therewith.

The lowermost section of the lamp, back-up section 15, is shown as being provided with a plug 43 in the bulb and socket aperture 45. As is conventional in the art, this plug 43 is adapted to be removed and replaced with a suitable bulb and socket assembly. The back-up lens 7 is formed with a curved front surface to match that of the lower portion of lens 33 with which it is in close adjacency and is provided with rearwardly extending top and bottom wall portions 47 and 49. A plurality of concentric prismatic rings 51 are provided on the inner surface of the lens 7 in order to project the back-up light beam rearwardly with a suitable spread and with uniform light intensity. The bottom wall 49 is provided with one or more shoulder-forming ribs 53 on its outer surface which serve to enable the lens 7 to be attached to the housing 3. As is clearly shown on Figure 3, a bearing plate 55 is secured to the housing 3 by means of a bolt 57 in such manner so as to be in abutment with the shoulder-forming ribs 53 thus clamping the lens 7 in position with its rearmost edges in sealing abutment with gasket 21.

The door 9 is secured about peripheral edge of housing 3 by means of a pair of mounting bolts 59. A decorative curved channel-like trim member 63 is clamped over the adjacent end surfaces of lenses 33 and 7 by means of the door 9 or by means of screws (not shown) threaded into the housing 3 and thus serves to anchor the bottom portion of the lens 33 and the top portion of the lens 7 against the sealing gasket 21.

As is clearly shown in Figure 3, the lens 31 is positioned in the lamp housing 3 so as to tilt rearwardly with respect to a vertical plane taken transverse to the longitudinal axis of the vehicle. The angle at which the lens 31 is assembled into the lamp 1 is fixed by the tool design considerations arising from the design of the lamp mounting surface provided on the vehicle body. The lens 31 is formed with a plurality of concentric dioptric rings 65 and catadioptric rings 67 on the inner surface thereof. The rings 65 and 67 are designed to present prismatic light bending surfaces causing substantially uniform illumination across the face of the lens 31 at the same time that the light beam is spread horizontally and vertically a predetermined amount to give the required degree of upward and side lighting.

However, since the lens 31 is tilted rearwardly, the light beam obtained therefrom is directed sharply downward, and it is essential that this be corrected in order that the tail and stop lights be visible from the required distances. This has been accomplished by providing a plurality of horizontally positioned, up-bending prisms 69 on the outer surface of the lens 31, the degree of prism, the prism angle, being that required to bend the light beam up an amount sufficient to position the axis of the beam substantially horizontal.

It should be noted that, as is clearly shown in Figure 3, the turning axis A—A of the rings 65 and 67 does not pass through the focal point P, the center of tail filament of bulb 26, of the stop and tail section 13 of the lamp 1, but instead is offset above the focal point. It has been found that by so offsetting the axis A—A, the light beam is not bent downward as sharply as it would have been had the axis A—A been located to either pass through or be located below the focal point P. As a result, the angle, and therefore the thickness, of the horizontally positioned, light up-turning prisms 69 may be held to a minimum thus assuring the required light intensity from the lamp 1 and enabling a rapid molding cycle time where the lens is formed of a plastic material. At the same time, it has been found that an excessive amount of offset of axis A—A results in a split beam pattern in that the spread of the catadioptric beam becomes so great that the light going straight ahead is weak and cannot be seen against the contrasting bright light of the dioptric area. It should be here understood that the amount of offset of axis A—A permissible and the degree of prism required to properly direct the light beam, will vary with the degree of tilt of the lens and the optical characteristics of the concentric rings 65 and 67.

As is readily apparent from the above, I have provided a vehicle rear lamp wherein the light beam may be simply and inexpensively controlled to produce the required characteristics despite the fact that the lamp may be a complex geometric configuration to conform with the styling of the vehicle. Likewise, it should be noted that by the lamp of my invention, the maximum signal surface area is presented.

While my invention has been described in terms of a preferred embodiment, it should be understood that other embodiments will occur to those skilled in the art, as examples of such embodiments, the inner and outer lenses may be assembled together as a unit in any suitable manner, i. e., heat welding the lenses together when formed of thermoplastic materials; or the lamp mounting surfaces provided on the vehicle body may be tilted forwardly instead of rearwardly as shown, in which case the inner lens would assume a like attitude and the offset of the prism turning axis would be below the focal point and down-turning prisms would be used instead of those described; or the lamp mounting surfaces on the vehicle body may be vertical, without any tilt, in which case the inner lens would also be vertical thus eliminating the need for the horizontal prisms and the offset of the turning axis may be either somewhat above or below or on the focal point. These and other modifications are considered as being within the intended scope of the claims which follow.

I claim:

1. In a vehicle lamp adapted for mounting on the body of a stylized vehicle, the combination comprising a lamp housing, a bulb and socket assembly positioned within said housing, a substantially planar light controlling lens positioned in said housing, said lens being tilted from the vertical plane a predetermined amount, a plurality of concentric prismatic rings formed on said lens to control the degree of spread and uniformity in light beam, a plurality of horizontally positioned light bending prisms on said light controlling lens to control the direction of the axis of the light beam, and an outer light passing lens having a curved surface positioned in front of said light controlling lens, the turning axis of said prismatic rings being offset from the focal point of said lamp an amount effective to decrease the degree of bending of the light required of said horizontal prisms in order to compensate for the tilt of said light controlling lens while at the same time being less than the amount at which the beam pattern is split.

2. In a device as set forth in claim 1, said light controlling lens being positioned with the top thereof extending rearwardly away from said bulb, said horizontally positioned prisms being formed to bend the light beam upwardly, and said turning axis being offset above the focal point.

3. In a device as set forth in claim 1, said light controlling lens being positioned with the top thereof extending forwardly toward said bulb, said horizontally positioned prisms being formed to bend the light beam downwardly, and said turning axis being offset below the focal point.

4. In a device as set forth in claim 1, said concentric prisms and said horizontal prisms being positioned on opposite sides of said light controlling lens.

References Cited in the file of this patent

UNITED STATES PATENTS

| 351,609 | MacBeth | Oct. 26, 1886 |
| 1,328,692 | Richard | Jan. 20, 1920 |
| 2,667,572 | Mead | Jan. 26, 1954 |
| 2,770,714 | Mead | Nov. 13, 1956 |